UNITED STATES PATENT OFFICE.

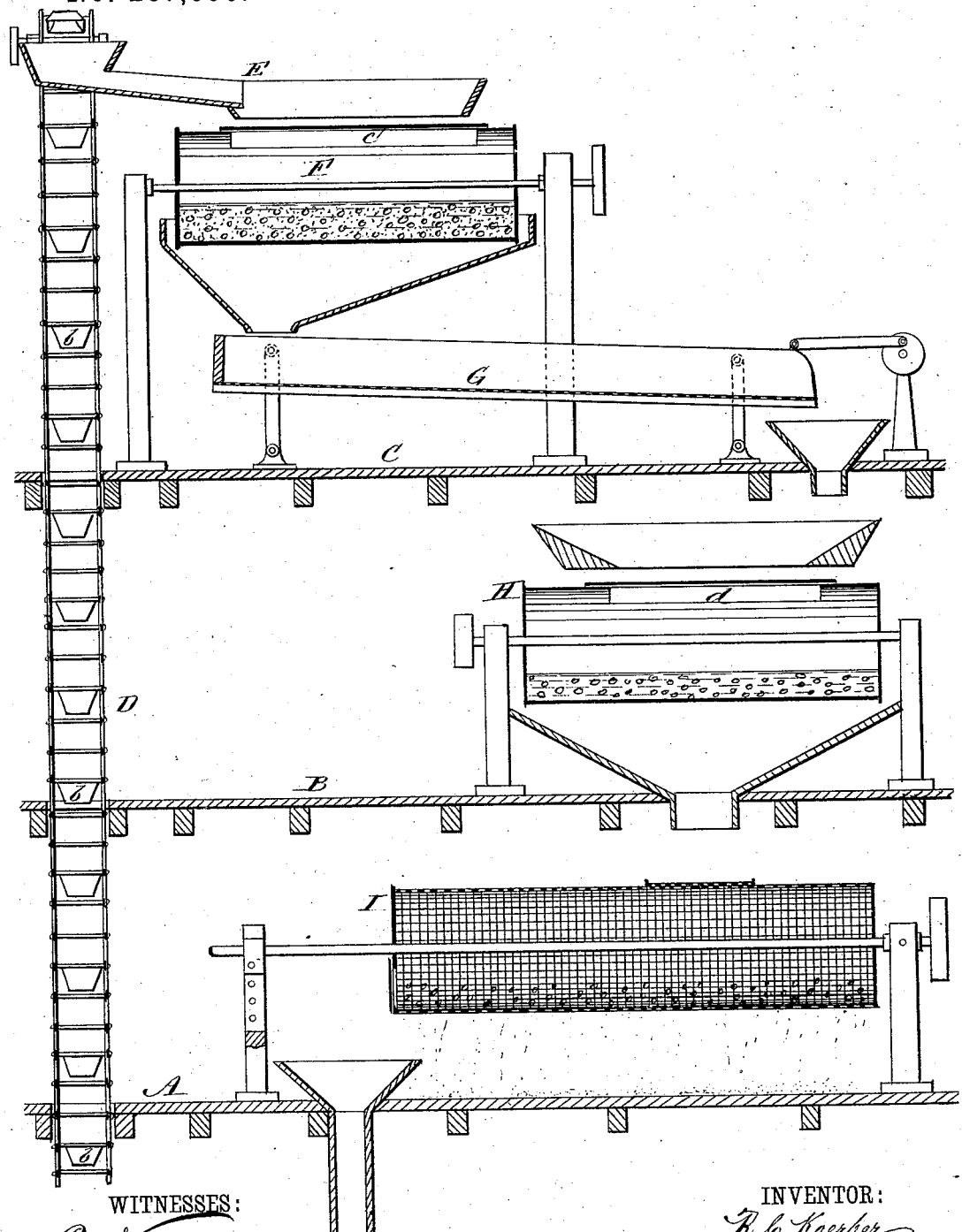

RUDOLPH C. KOERBER, OF AUSTIN, TEXAS.

PROCESS OF AND APPARATUS FOR CLEANING, TINTING, AND POLISHING PECAN AND OTHER NUTS.

SPECIFICATION forming part of Letters Patent No. 287,690, dated October 30, 1883.

Application filed May 16, 1883. (No model.)

*To all whom it may concern:*

Be it known that I, RUDOLPH C. KOERBER, of Austin, Travis county, and State of Texas, have invented certain new and useful Improvements in Processes of and Apparatus for Cleaning, Tinting, and Polishing Pecan and other Nuts, of which the following is a full, clear, and exact description.

This invention consists in certain processes of cleaning and tinting pecan and other nuts, and of apparatus therefor, also apparatus for polishing the nuts after they come from the cleaning and tinting devices, substantially as hereinafter described.

Reference is to be had to the accompanying drawing, forming a part of this specification, which represents a sectional elevation of a building and apparatus therein for cleaning, tinting, and polishing nuts in accordance with my invention.

A B C in the drawing indicate the different floors of a house or building in which is arranged the machine or apparatus for operating upon the nuts. This apparatus will be best described in connection with the process or mode of operation.

The pecan-nuts, as they are brought in from the woods, are carried up by an endless chain or other suitable elevator, D, fitted with buckets $b$, to or above the highest floor, C, of the house, whence they are shoveled or run by a funnel, E, into an upper horizontal close cylinder, F, made of sheet-iron or other suitable material, said cylinder being journaled in suitable uprights on the floor C, and being fitted with a lid, $c$, for reception and discharge of its contents. Along with the nuts in this cylinder F are also introduced a small quantity of common lye, two buckets (more or less) of river sand or gravel, and one gallon (more or less) of water. Its lid having been closed, said cylinder is then rapidly rotated by engine or other power—say at a velocity of about forty (40) revolutions per minute, or it may be greater or less. After this motion has been kept up for a sufficient length of time, twenty minutes in many cases sufficing, the remnants of the hulls and shells and all adhering dirt will be loosened, so that the nuts will come clean from the cylinder. Upon arresting the motion of the cylinder F and opening the lid $c$ from beneath, the contents of said cylinder are conducted or allowed to fall onto an inclined vibrating screen or sifter, G, actuated by any suitable mechanism, and down which the nuts roll, while the gravel or other suitable abrading substances and the loosened dirt are separated from the cleaned nuts by falling through the meshes or interstices of the screen G. From the tail end of the screen G the cleaned nuts fall or are conducted by any suitable means into a second sheet-iron or other close horizontal cylinder, H, arranged beneath, and provided with a lid, $d$, also journaled in suitable bearings to admit of its being rotated by pulley or otherwise. This cylinder has introduced within it, along with the cleaned nuts, a bucketful (more or less) of tinting material for the purpose of restoring the abraded nuts to their original color, or of giving to them a richer and darker or improved hue, as may be desired. Various tinting substances may be used; but I find that sanders-wood cooked in a small proportion of lye, with water added, makes an excellent dye for the purpose, the lye serving to cause the tinting solution, which is not injurious, to penetrate or impregnate the shells of the nuts. To thus tint the nuts, the close cylinder H, containing them and the dyeing material or solution, is rapidly rotated for any required amount of time—say for twenty minutes, or thereabout—at a velocity of fifty revolutions a minute, more or less. After the nuts have been tinted, the cylinder H is stopped and opened and its contents run into a still lower cylinder, I, which is peripherically covered with wire-cloth, or is otherwise of a reticulated or screen-cloth, or is otherwise of a reticulated or screen-cloth construction, and preferably arranged to occupy a horizontal position. This cylinder is supported in suitable bearings, and is driven to rotate at any desired velocity, for the purpose of removing the roughness which the nuts have when coming from the tinting-cylinder, and of polishing them by their rubbing one against the other, all impurities mixed with the nuts from cleaning or tinting passing off through the meshes of the cylinder I. This polishing of the nuts gives them a fine and natural appearance, and they are then ready for packing or market.

Having thus described my invention, I claim as new and desire to secure by Letters Patent—

1. The process of cleaning pecan and other nuts, which consists in subjecting them to the action of a lye, sand or gravel, and water within a rotating close vessel, substantially as specified.

2. The process of cleaning and tinting pecan and other nuts, which consists in first subjecting them to the action of a lye, abrading substances, and water within a rotating close vessel, and subsequently to the action of a dyeing solution in a separate rotating close vessel, essentially as described.

3. The combination, with the nut-cleaning cylinder F, having a door, c, of the vibrating inclined screen or sifter G and the dyeing-cylinder H, having a door, d, for operation together or in relation with each other substantially as specified.

4. The combination of the nut-cleaning cylinder F, the vibrating screen G, the close dyeing-cylinder H, and the polishing reticulated cylinder I, substantially as and for the purpose set forth.

RUDOLPH C. KOERBER.

Witnesses:
N. D. CUNNINGHAM,
E. E. SMITH.